United States Patent
Brazier et al.

(10) Patent No.: US 8,135,693 B2
(45) Date of Patent: Mar. 13, 2012

(54) METHOD FOR COMPILING, TREND-TRACKING, TRANSMITTING AND REPORTING OPINION DATA

(76) Inventors: Sandra B. Brazier, Agoura Hills, CA (US); Deidra B. Jeffries, Valencia, CA (US)

(*) Notice: Subject to any disclaimer, the term of this patent is extended or adjusted under 35 U.S.C. 154(b) by 525 days.

(21) Appl. No.: 12/357,314

(22) Filed: Jan. 21, 2009

(65) Prior Publication Data
US 2010/0185641 A1 Jul. 22, 2010

(51) Int. Cl.
*G06F 17/30* (2006.01)
(52) U.S. Cl. ........ 707/705; 707/758; 707/769; 707/781; 707/792; 707/802
(58) Field of Classification Search .................. 707/705, 707/758, 769, 781, 792, 802
See application file for complete search history.

(56) References Cited

U.S. PATENT DOCUMENTS

| | | | | |
|---|---|---|---|---|
| 6,801,900 | B1 * | 10/2004 | Lloyd | 705/1.1 |
| 7,873,589 | B2 * | 1/2011 | Shiffman et al. | 706/47 |
| 2003/0182177 | A1 * | 9/2003 | Gallagher et al. | 705/10 |
| 2008/0052259 | A1 * | 2/2008 | Shiffman et al. | 706/47 |
| 2008/0103877 | A1 * | 5/2008 | Gerken | 705/10 |
| 2010/0161382 | A1 * | 6/2010 | Cole | 705/10 |

* cited by examiner

*Primary Examiner* — Shahid Alam
*Assistant Examiner* — Andalib Lodhi
(74) *Attorney, Agent, or Firm* — Kelly & Kelley, LLP

(57) ABSTRACT

A process as provided for streamlined opinion data submission to decision makers. The process provides electronic transmission to local, state and Federal elected representatives based on physical location, provides/gathers issue-based opinions from the public, and consolidates the opinions in a relational database for dissemination to the public and/or elected officials and/or other decision makers.

22 Claims, 7 Drawing Sheets

METHOD FOR COMPILING, TREND-TRACKING, TRANSMITTING AND REPORTING OPINION DATA

BACKGROUND OF THE INVENTION

The present invention is directed to a user-driven, non-partisan, internet, real-time, pulse-polling, trend-tracking, opinion-gathering, storage and delivery opinion method that facilitates civic participation and offers advantages to the American public, Federal and state representatives, media, corporations, blogs, and government agencies, and research institutions.

The present invention generally relates to a process for streamlined opinion data submission and polling opinion information to decision makers and distributing same. The present invention also relates to a process for creating a subscription database based on polling information results for access by decision makers. More particularly, this invention relates to an issue-based, real-time, pulse-polling, trend-tracking, opinion-gathering process for accumulating and consolidating the same in a database for dissemination and availability of said opinion data to the public and decision makers.

Historically and even today, US voters have been frustrated by the lack of an effective and convenient delivery method to convey their opinions to Federal, state and local elected representatives ("ERs") on issues of importance to them as citizens. Because so few opinions are generated by the American public, the actions of ERs do not always reflect the will of the people. Additionally, ERs have received fewer constituent opinions than potentially possible because constituent internet, phone and U.S. mail access to them is tedious, time-consuming, daunting and therefore ineffective. The lack of these constituent opinions leaves ERs uninformed regarding these valuable opinions which, were they received, would give them direction as to how to vote. Therefore, there is a need for an opinion delivery method that overcomes these frustrations and institutes a robust methodology for citizen engagement which potentially and constructively influences legislative outcomes and cultural/social change.

The public has become increasingly enlightened and galvanized, even radicalized, by talk radio over the past several years by such commentators as Hugh Hewett, Dennis Prager, Sean Hannity, Michael Medved, Laura Ingraham, Ann Coulter, Larry Elder, Rush Limbaugh, and Glenn Beck. Equally significant are the influences of internet blogs, advocacy groups, grassroots campaigns, MySpace, MTV, and others which involve teens, youth, and adults. This population or market has seen what can be accomplished by an informed electorate in California's November 2004 election and in its preceding gubernatorial recall. It also has seen egregious legislative action go unaddressed by the public before a vote and without its even knowing the issues beforehand.

However, there are issues that cannot be addressed solely or timely by leadership elections. There are agendas being advanced behind the scenes legislatively, judicially, and culturally that the public, if informed, would want to either support or oppose. However, heretofore, there has been no forum for such expression, no channel for its citizen voice to be heard and which connects it to decision makers on social, cultural, political and economic issues. The "silent majority" of all ages, as embodied in the radio-listening, internet blogo-sphere, TV and print media markets, is realizing that it must have a voice; that silence is no longer an option; and that the price of silence has become too high. At the same time, this market realizes that just hearing and reading about the issues and voting for candidates and on initiatives and referenda is not enough.

There is presently no internet polling resource that gathers in real time and trend tracks voter/public opinion data and provides the valuable informational impact such information can offer ERs, the public, media, blogs, candidates, political action committees, political action groups, search engines, government agencies, think tanks, and corporations (hereinafter "decision makers"). In addition, there is no internet polling resource which gathers in real-time and trend tracks voter/public opinion data and provides the valuable informational impact of such information regarding candidates and election data and which offers the decision makers access to this information.

Previously, internet voter polling took the form of a one-issue, one-day vote as featured by a media agency or other internet, television, or radio station for their short-term marketing interest in any given topic. Thus television networks and internet polling sites are typically single Yes/No issue polls on a given day and thus offer no trend-tracking value.

Typical media polls are not for the purpose of influencing ERs and influencing the outcome of legislation consistent with citizen majority views and/or public opinion. Such are for entity-specific reporting purposes only. Polling participation is limited to a single issue and determined by the entity and typically is only one day in duration. When voters/audience/internet users wish to speak out to their ERs, they are limited by this format as to one issue and one day. Typically, the voter/audience/internet user has an interest in many other issues on which to speak out other than the one featured by the entity but has no internet site which provides multiple issues or user-driven issues. Nor is the voter/audience/internet user data stored for any trending purpose for future analysis by ERs, media, business, government to influence outcomes related to legislation or media scrutiny.

Companies that operate in the political, social, economic polling market, such as Harris, Rasmussen, Pew and Gallup, conduct polls frequently based upon agenda-driven questions (depending upon who is paying for the poll) and allow for minimal if any individual/personal opinion/commentary. Further, questions generated in these polls are often complex and convoluted and can be crafted to achieve a certain outcome. These polls are limited in scope, population, and frequency. This kind of polling data is not in real-time, nor is it considered pulse-polling or trend-tracking as it is limited by the number of people in the sample and the infrequency of these polls. This is sometimes called "dipstick" data or polling.

There is a need for a means to communicate the opinions of citizens on issues ranging from politics, education, media, fashion, morals, and social/cultural values so that the public can make itself heard on these issues by those who influence outcomes on an issue-based, real-time, pulse-polling, trend-tracking basis. With no easy access to all elected officials representing him/her individually, the busy, time-limited citizen is left to his own devices (letter writing, phone calls, and emails to difficult-to-locate and relocate phone numbers and addresses) and he/she succumbs to the pressures of daily living that have higher priority such as child care, earning a living, eating and sleeping. Accordingly, the time is right for the invention, an issue-based, real-time, pulse-polling, trend-tracking internet website service that will allow easy access to elected officials and the accumulation of their opinion data to be made available to the elected officials and other interested decision makers. Thus, such data can be made public through the media and via this invention to hold our lawmakers and others accountable to the "will of the People."

The present invention fulfills these needs and provides other related advantages.

SUMMARY OF THE INVENTION

The present invention is directed to a method for compiling, trend-tracking, and reporting opinion data. The method begins with the step of providing a system for users to submit opinion data. The system comprises distinct but interactive computer databases including an issues database, a user identity database, and a user opinion database. Next, a list of issues is compiled for storage in the issues database. The list of issues includes current political, business, news and public interest issues and is updated regularly. Next, user identity information is collected from users and stored in the user identity database. The list of issues is then presented to a user.

Opinion data relating to at least one of the issues on the list of issues is gathered. The user opinion database is maintained separate from the user identity database. This is so the opinion data does not reveal the user identity information of the user providing the opinion data. The opinion data is stored in the user opinion database for real-time, trend-tracking of public opinion on the list of issues stored in the issues database.

The system also generates reports containing the opinion data. These reports are made available to decision makers interested in the lists of issues addressed by the reports. The computer databases further comprise a anonymous/voluntary user demographic database which stores demographic information collected from the users by the system. The real-time, trend-tracking of public opinion includes relating the public opinion to the demographic information stored in the demographic database.

The computer databases further comprise a decision maker's database and a user communication or decision makers communication database. The method includes generating a communication from a user containing said user's opinion data on an issue. The generated communication is stored in the user communication database. Decision makers interested in the issue from the list of issues and/or related to the user are identified from the decision maker's database. The generated communication is then transmitted to the identified decision makers. Decision makers related to the user are identified based upon residence information of the user compiled in the user identity database.

The transmitting step further comprises allowing the user to select to which decision makers the communication is transmitted. The system may also connect the user to a webform or email address of a decision maker from the decision maker's database. The decision maker's database also maintains voting records, attendance records, and a comparison of voting records versus public opinion information of decision makers who are elected representatives.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawing illustrates the invention. In such drawing.

DETAILED DESCRIPTION OF THE PREFERRED EMBODIMENTS

The present invention generally relates to a website which: 1) provides convenient and simultaneous to email addresses or web forms of all of a citizen's local, state, and Federal elected representatives ("ERs") based on his/her unique residence address and precise legislative districts at all levels to whom he/she can send a position and opinion on any important topic; 2) provides/gathers issue-based, real-time, pulse-polling, trend-tracking opinions from the public (adults 18 and over and young adults under 18); 3) consolidates same in a relational database; and 4) disseminates and makes available said opinion data to the public and decision makers. FIGS. 1-6 illustrate a specific preferred embodiment of the present invention. The invention is dedicated to giving the public a vehicle to express their opinions on, including without limitation, local, state and Federal issues of the day, pending legislation, court decisions, and education, political, social/cultural, and/or economic issues. Every effort is made to provide a fair, balanced, and impartial presentation of issues inviting and empowering the public of all persuasions to express their opinions to influence their decision makers.

Figure 1:
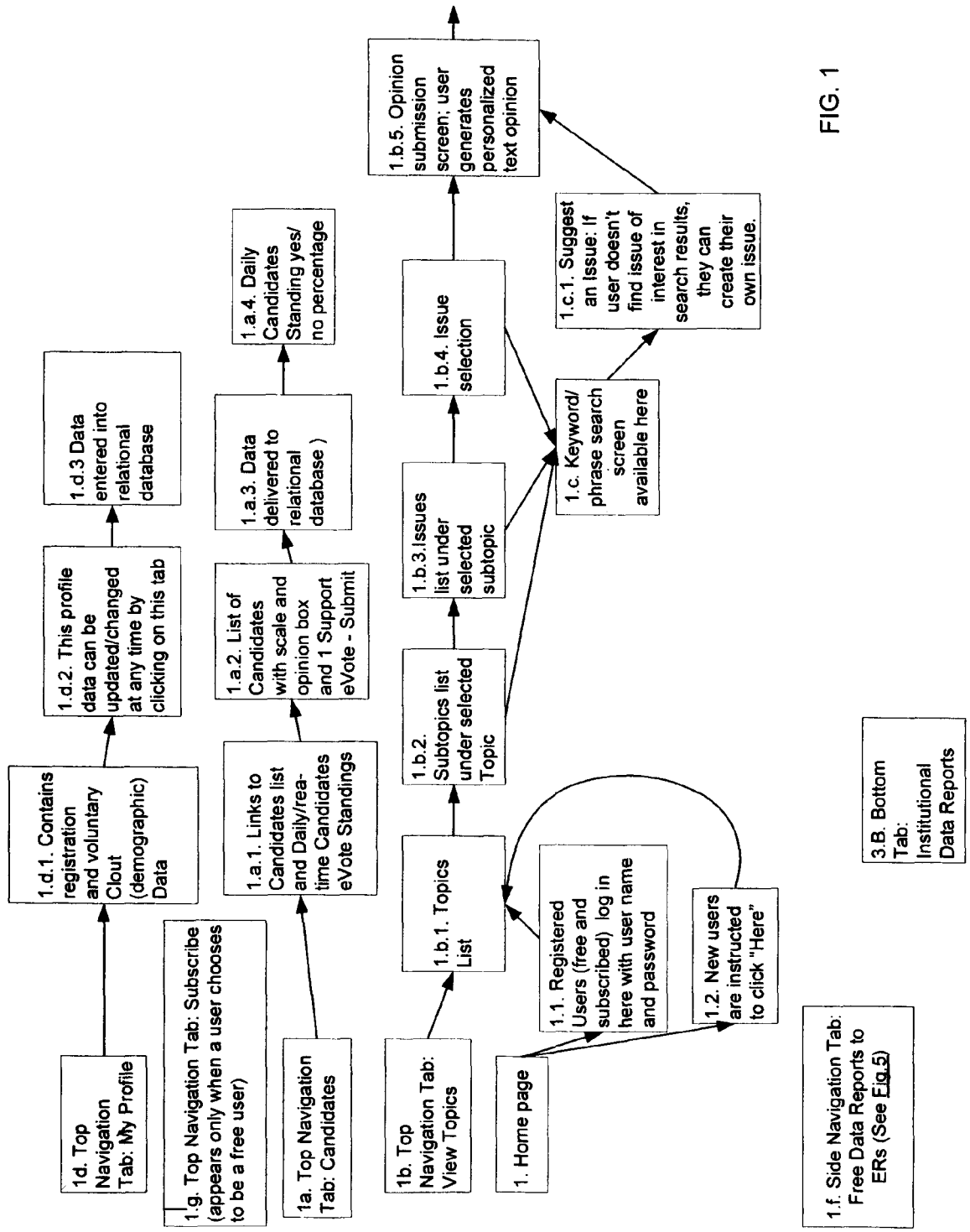
FIG. 1 is a flow chart illustrating the options appearing on a home page of a preferred embodiment of the present invention.
Figure 2:
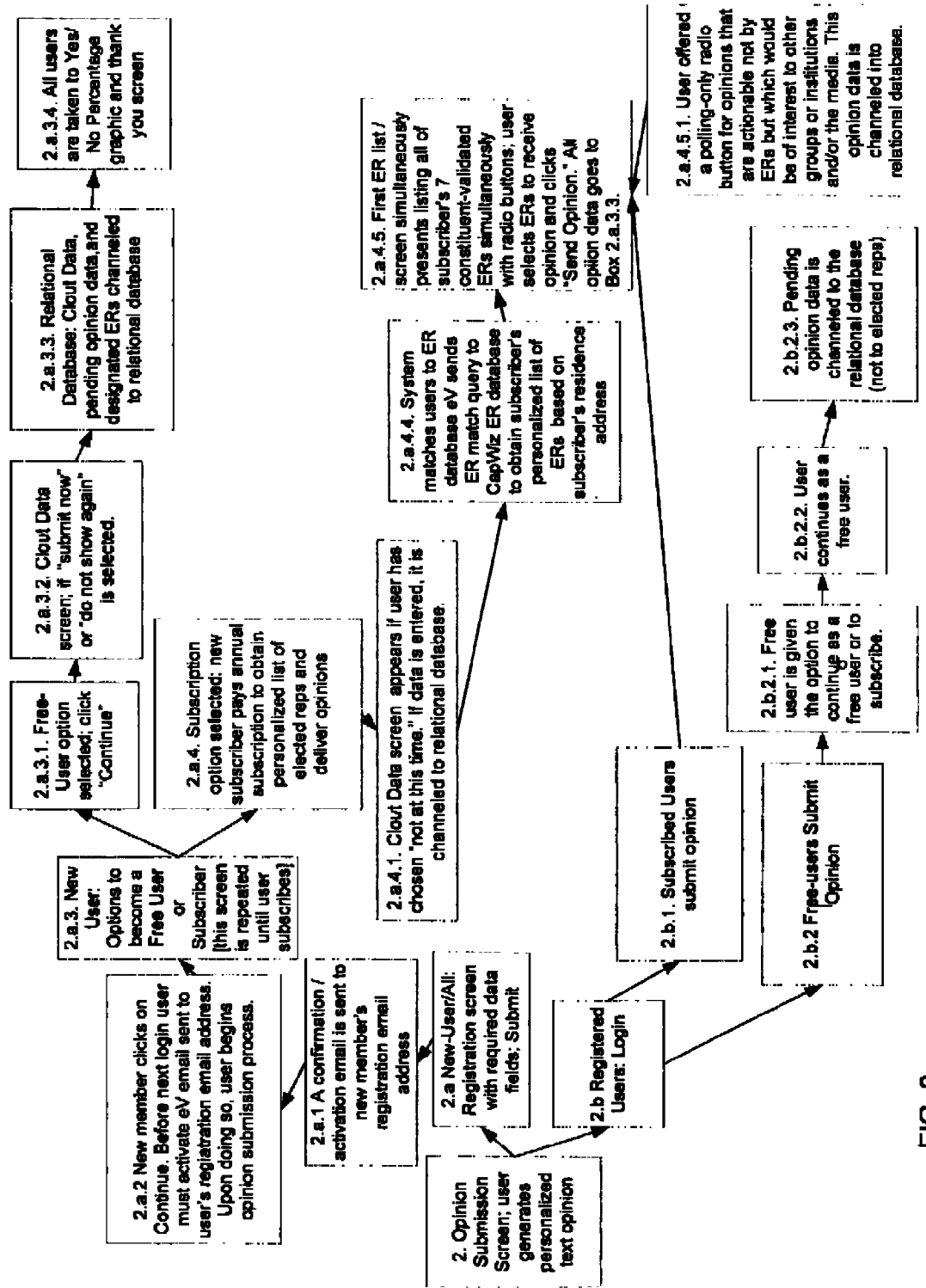
FIG. 2 is a flow chart illustrating new and registered user log-in page of a preferred embodiment of the present invention.
Figure 3:
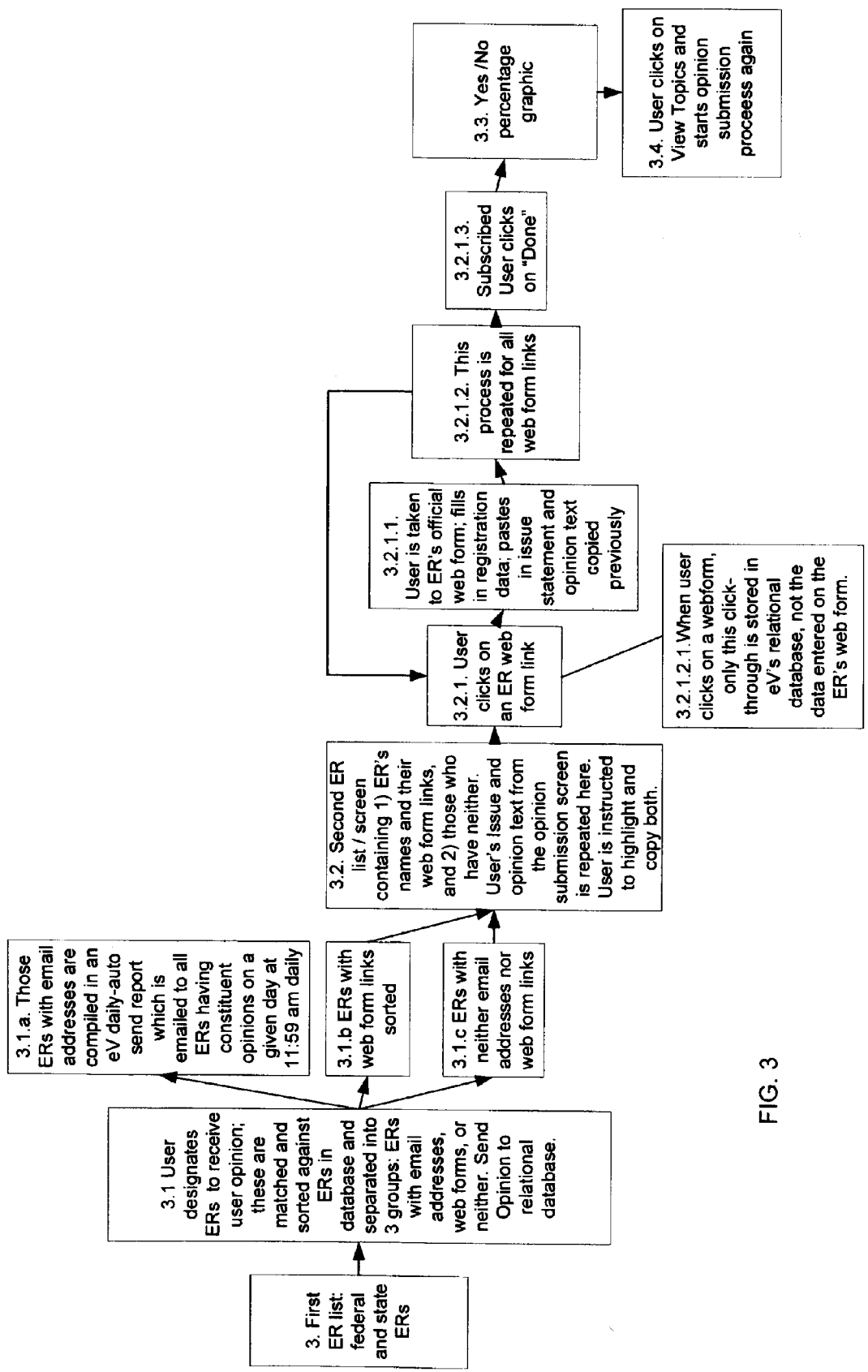
FIG. 3 is a flow chart illustrating the selection of elected representatives in a preferred embodiment of the present invention.
Figure 4:
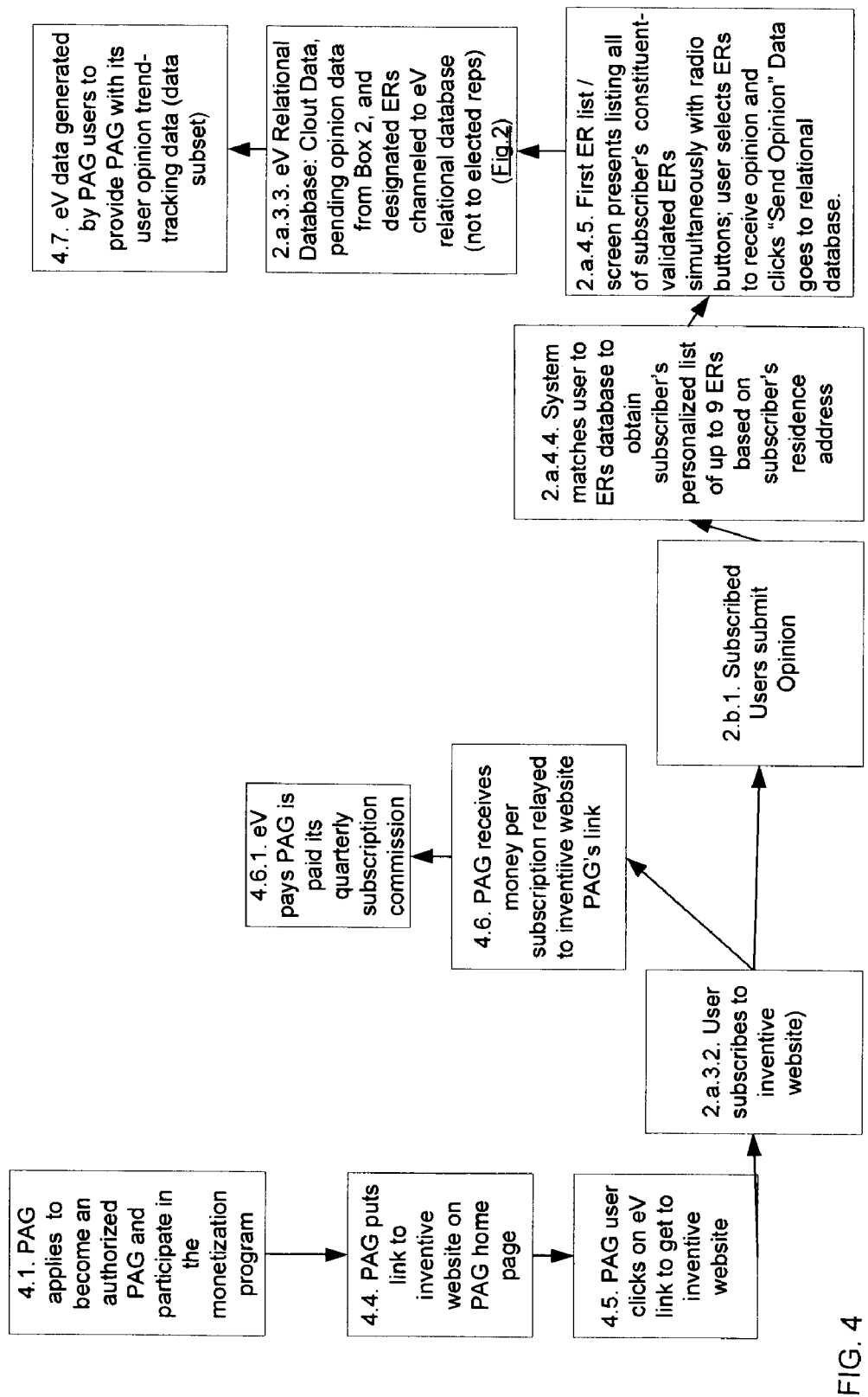
FIG. 4 is a flow chart illustrating access of a political action group to a preferred embodiment of the present invention.
Figure 5:
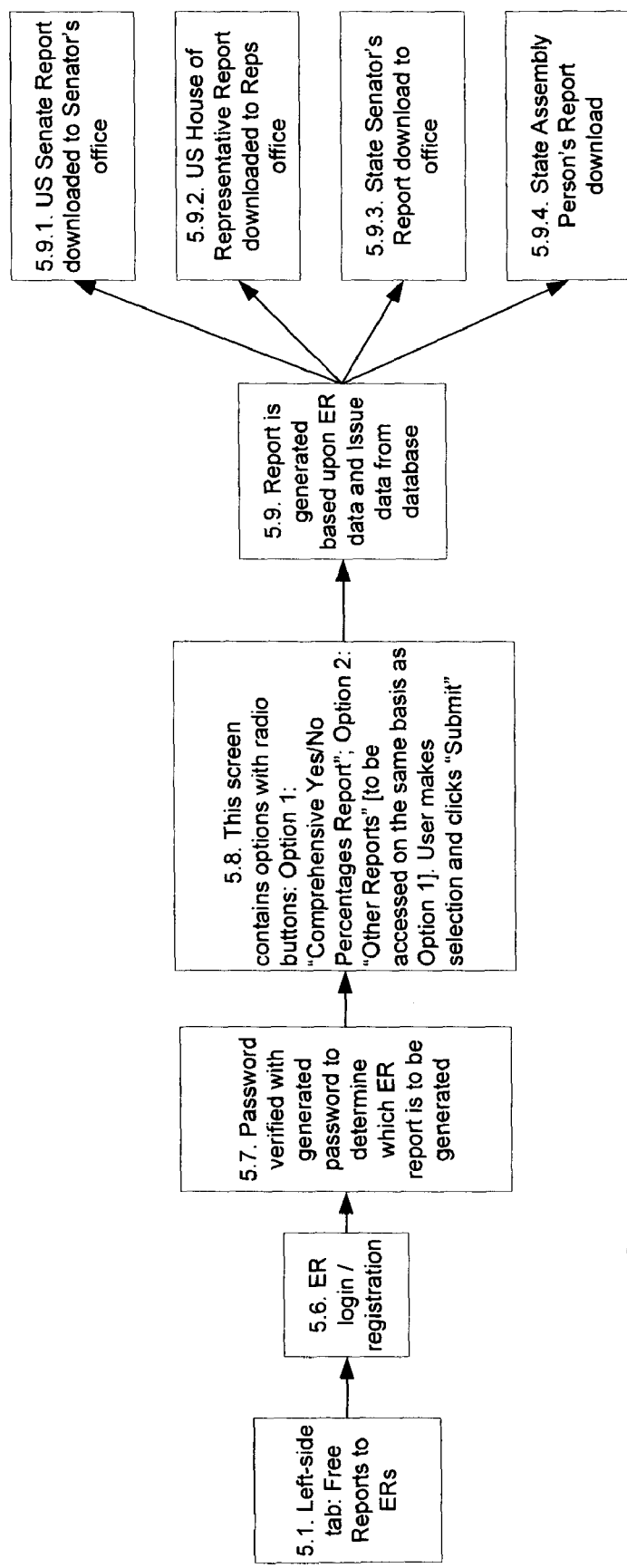
FIG. 5 is a flow chart illustrating the access of an elected representative to a preferred embodiment of the present invention.
Figure 6:
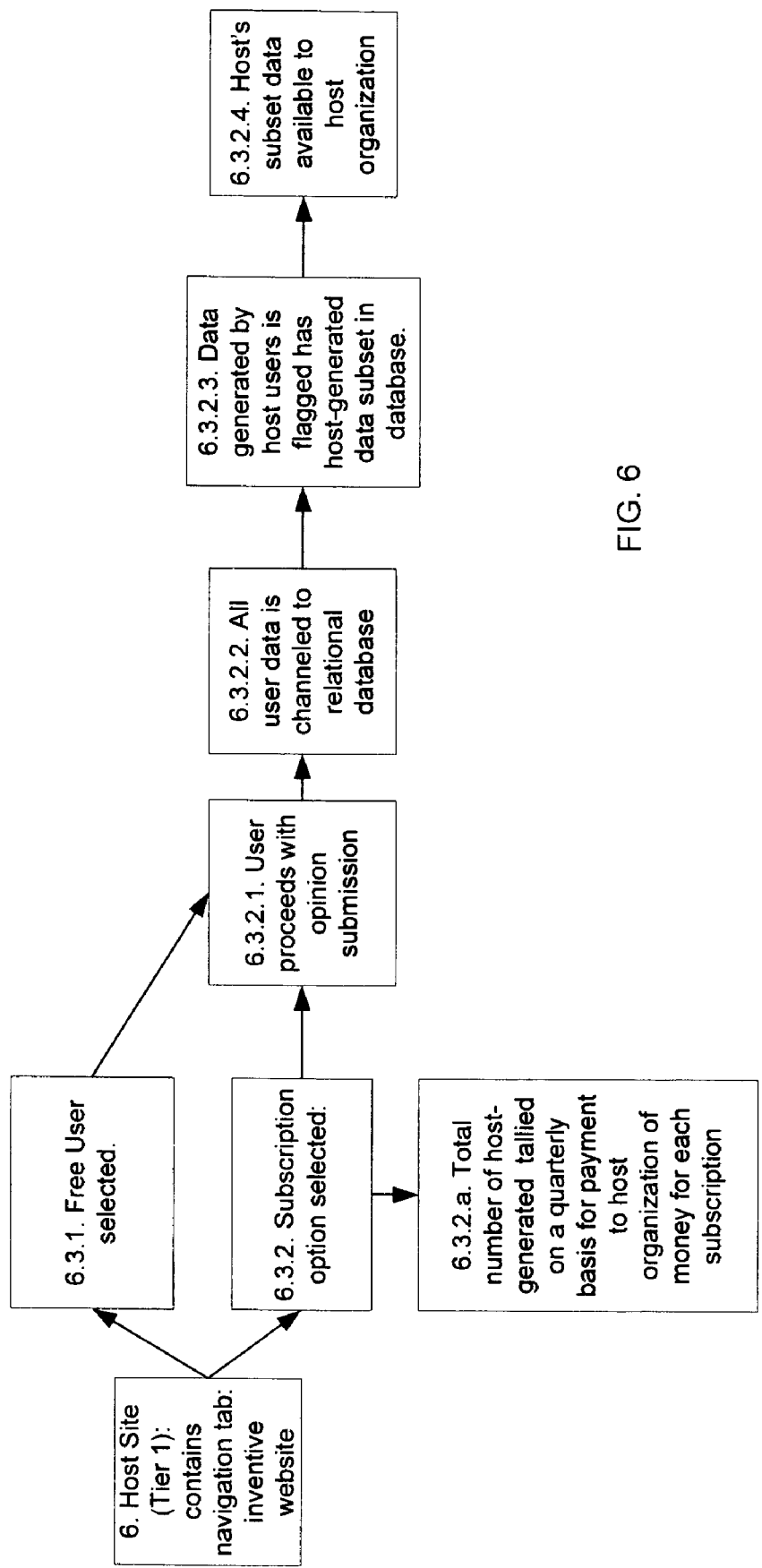
FIG. 6 is a flow chart illustrating embedding a preferred embodiment of the present invention in a host site.
Figure 7:
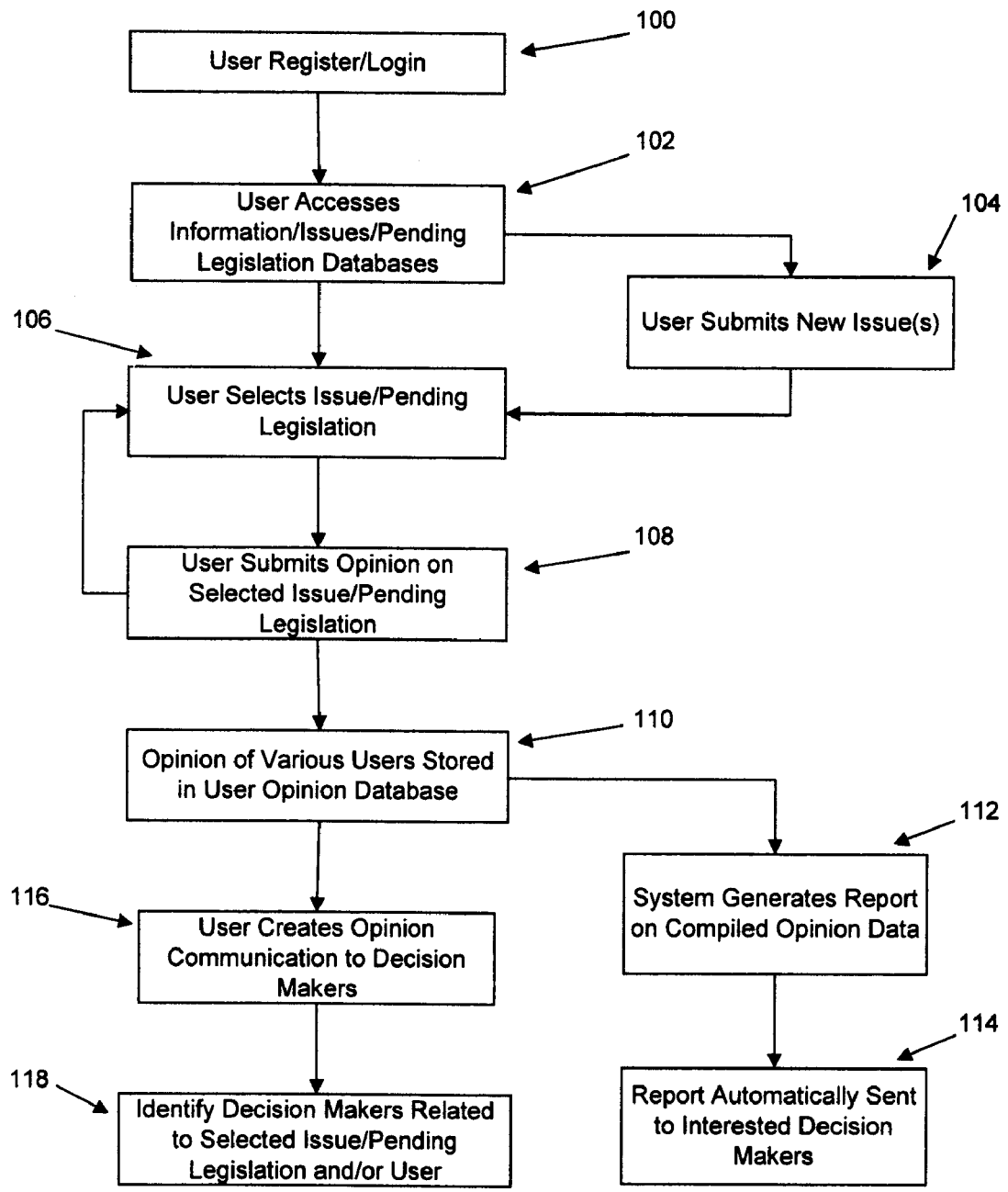
FIG. 7 is a flow chart illustrating an overall method of the present invention.

FIG. 7 generally illustrates the method of the present invention. Initially a user registers with and/or logs into the website of the present invention (100). Next, the user accesses information/issues/pending legislation databases (102). At this point a user may submit a new issue for consideration on the list (104). Subsequently or alternatively, the user may select an issue/pending legislation upon which to opine (106). The user then submits his or her opinion on the selected issue/pending legislation (108). An individual user may repeat the selection and submission steps as often as necessary to opine upon all of the issues of interest to the user.

The opinions of various users are stored in the user opinion database (110). The compilation of these user opinions are stored for real-time, pulse-polling, trend-tracking opinions. The system then generates a report based upon the stored user opinion data (112). These reports may be automatically sent to interested decision makers (114). The term "decision maker" is intended to refer to any person interested in public opinion. A decision maker may include an ER, a corporate leader, a business manager, a media outlet or any other entity similarly interested in public opinion. Throughout this description, the phrase "decision maker" will be used interchangeably with any other descriptor such as "elected official", "ER", or "business manager".

In addition, a user may create an opinion communication to be sent to a decision maker (116). The system may automatically identify decision makers related to the selected issue/ pending legislation and/or the user (118). Each of the above steps are described in more detail in the following description.

Once an issue is articulated (via the radio or print media or within a user's own thought process), citizens interested in that issue can visit the invention website which has a link directly to a relevant issue/subject, i.e., bill number, if applicable, as well as the subscribed user's full complement of all (initially nine) Federal, state, and local ERs based on the user's unique residence address, as a validated constituent. This list could also include county supervisors, city council members, school board members or any other type of ER at any level. The website provides a submit link, i.e., "To submit your opinion, CLICK HERE." This links the subscribed user directly to a list of ERs governing the user's residence address based on state and Federal districts. The user is then provided with a textbox in which to enter a brief, unique, personal opinion (up to 500 words). This caliber of opinion is viewed by the ERs as more valuable than a "point and click" yes/no vote as on pre-fabricated opinion/vote websites or cookie-cutter eblast emails from advocacy groups. Thus, within two clicks and a few minutes to write a personal, unique opinion, the subscribed user conveys his/her opinions to some or all of the appropriate state, Federal and local ERs that would be voting on or influencing any given issue/outcome.

Since most citizens may not know the name(s) of their ERs, how to determine who their ERs are, or how to contact them, the current invention requires that they simply input their address and five-digit zip code and instantly provides the identity of and access to all of the ERs governing that address as potential recipients for the subscribed user's opinion. The subscribed user can select to electronically submit his/her opinion to one or more of the listed ERs. A user would also have the option to contact other ERs, i.e., those spearheading a legislative action, and provide his/her opinion. User opinions can be directed to politicians that represent the user as well as other politicians in other areas, districts or states, or that chair legislative committees or are members of such committees, etc., who are not his/her direct ERs.

The present invention has provision for two types of users, a free user and a subscription user. The benefits of a subscription user have been described above. Becoming a subscription user is not required to use the inventive website and a free user status need never be changed or can be changed at any time by subscribing to the invention website ER constituent validation service.

A free user has the ability to submit opinions on the issues presented by the inventive system. The opinions from free users are stored in the invention database and are combined with all opinions from free users and subscription users for trend-tracking and reporting purposes. However, opinions from free users are not delivered to elected representatives or decision makers as are opinions from subscription users.

The website provides a list of many pending issues that is frequently updated as to new issues so that the subscribed user can scan multiple issues, opine on any/all of them, and electronically transmit his/her opinion using the address-driven/constituent-validated list of one or more of the ERs provided by the invention database. For convenience, the user can also search for issues of interest by doing a keyword/phrase search. Users would not have to access the news media to identify issues of interest prior to independently, routinely, visit the website to register their opinions using the invention.

The present invention empowers free and subscribed users to voice their opinions to ERs using the invention's one-stop web location and the issues database contained therein. The present invention combines the voice of a single user with millions of other voices for receipt by ERs, politicians, and other decision makers. The present invention database provides trend-tracking data with anonymous demographics for use by ERs, politicians, candidates, corporations, and the media. Thus, the present invention also provides a "virtual citizen lobby" when ERs and others use the trending data available through the present invention's database to make responsive decisions. Based on their defined specifications, interested parties subscribe to the reports which the present invention can provide. The present invention retains all opinion-related data from subscribed and free users in the invention's relational database even though the subscribed user's opinion is electronically forwarded to ERs.

User features:
(1) The present invention provides the user with access to all levels of government in all 50 U.S. states so that user opinion data can be communicated and expressed regarding the actions of the U.S. President, the U.S. Vice-President, U.S. Senate and House of Representatives, state governors, state senates, state assemblies, and mayors. Also included, but not limited to, could be: county and city governments, special state and Federal committees, city councils, school boards, and government agencies (e.g., U.S. State Department, U.S. Departments of Commerce, Education, Defense, Federal Trade Commission, and Federal Communications Commission), special districts, utilities, transportation, etc., can also be accessed by links or other web services via the invention database interfaces.
(2) The present invention also provides a feature that permits under-18 site users to register their opinions on a Yes/No and scale (1-10) basis with or without a personal text email opinion which will become part of the invention relational database for retrieval on a fee-based report basis by corporate, educational, and governmental entities. Corporate, education and governmental entities (non-individual users) which order such reports include, but are not limited to, the following marketing categories: education, media, fashion, government, and many others. This feature provides real-time, pulse-polling, trend-tracking information on a paid-for/subscription report basis to corporate, educational, government, and others to assist in their decision-making processes;
(3) The invention site provides means to limit/prevent duplicate and multiple opinions from one user to thwart the invention's effort at objectivity by users "stuffing the ballot box" or to artificially skew the results of user opinion submissions;
(4) The invention provides rules and protocols to minimize or eliminate abuse of the invention: no profanity; no vulgarity; no excessive number of opinions per issue per user, among others. Users breaking these protocols will be "dumped" from the invention site and the balance of their subscription voided with no refund. A user may re-subscribe if he/she honors protocols;
(5) User identity confidentiality is protected from disclosure to third parties, with the exception of users' opinions which user designates for transmission to their ERs;
(6) Access to local, state and Federal ERs; the user chooses to which ERs his/her opinion will be sent;
(7) Constituent-validated, ERs locator(s) using street address and 5-digit (or 9 digit zip code if known);
(8) A text box to submit a 500-word email expressing a user's unique opinion to a decision maker. A word-count indicator is provided to apprise the user of the number of words used and remaining;

(9) Full demographic capabilities: all users voluntarily provide personal demographic information (e.g., education, income, number of children, marital status, etc.). This demographic information provides decision makers and those subscribing to a position report weighted, statistical information in relation to the users' issue positions. All users may voluntarily provide their anonymous weighted demographic data in conjunction with their opinion and registration information;

(10) The present invention provides optional monitoring to ensure that the integrity of each portion of the database remained separate. For example, the separation between the legislative actions/issues, opinion and the user's identity portions may be optionally overseen by validating entities. One validating entity may monitor the separation of both. Alternatively, a separate monitoring entity may maintain each separate database. The purpose of such separation is so that any identity information provided by the user is not linked to the user's opinion data or weighted demographic data;

(11) Sign in/registration: Minimum registration information required: user name, password, city, county, state, zip code and email address;

(12) The present invention further offers access by media and corporate decision makers by a corporate access to the invention's opinion-gathering, data collection and data retrieval functions. The corporate access is available by a corporation on a subscription basis. User anonymous demographic and opinion data provided via such access is part of invention's database and available to the corporation as a non-individual user by an institutional/corporate report subscription;

(13) A user may contact an ER who the user considers to be among those spearheading a legislative action with which the user agrees or disagrees. In this way, a user can offer an opinion in support or otherwise to other than his/her elected representative. User opinions can be directed to politicians that represent the user as well as other politicians in other areas, districts or states, or that chair legislative committees or are members of such committees. Further, if, by way of example only, a California user wished to give a U.S. Senator from another state (perhaps as a Senate committee chairman) an opinion and personal email about an issue, he/she could do so even if that U.S. Senator was not his/her own senator. There are national issues on which users may want to address their opinions to ERs who have, for example, committee responsibility which affect citizens beyond an ER's precinct/district and which deal with national concerns. The invention captures these user opinions in its database for reporting purposes;

(14) The present invention provides the user access to proposed, related legislation of critical interest to the public. A user may relate his/her selected issues of interest from the issues grid/table to these issues of critical interest. The user is provided with a means to address his/her concerns to ERs using the invention site features;

(15) The issues can be presented by specific legislation or the user can access a category of issues that will connect the user with proposed laws concerning that issue (e.g., media, medical, healthcare, national security, etc.);

(16) A "suggest an issue" feature is based on keywords/phrases or full questions or statements submitted by users in a text box format. Inclusion of suggested issues in the invention prepared issues grid/table based on this suggestion process is based on a predetermined number of times other users suggest the same keywords/phrases;

(17) The ER receives:
User's personal, unique text opinion up to 500 words;
Yes/No opinion and scale (e.g., 1-10/weak to strong);
Subscribed user/sender data: title (optional), full name, address and email address only (the same and only information required to register to vote or to access an ER's official email or log on to his web form and send an email and/or confirm by the ER that user resides in the ER's district/constituent validation).

Topics/subtopics/issues features:
(1) Yes/No position radio buttons and scale (e.g., 1-10) is provided with each issue and opinion text;
(2) Issue categories and opinion text are linked to/stored in a relational database which collects these opinions and Yes/No and scale (e.g., 1-to-10), or other format, for later retrieval and creating reports. Topic/subtopic and issue links related to current events and legislation;
(3) Issue topics, issue subtopics and issue Yes/No and 1-10 scale opinion statements as dropdown menus are potentially unlimited;
(4) Invention issues are removed from the issues list when user interest declines to a predetermined number over a period of time. An issue removed for lack of interest is always retained in the database and may be added to the list again when the issue keyword(s)/phases increased via the "suggested issue" function to a predetermined number for reinstatement or when the issue re-surfaces in the media;
(5) When the user accesses a specific issue in the invention, the user is informed of all related, pending legislation due for a vote on that issue. The user can then choose based on this information to additionally submit position(s) on the related, pending legislation.

Database features:
(1) Access the invention's users' votes/percentages/trends on any given issue addressed on the website at any given time;
(2) Issue categories and opinion text are linked to/stored in a relational database which collects these opinions and Yes/No and scale (e.g., 1-to-10) for later retrieval and creating reports;
(3) Yes/"in favor" or No/"oppose" positions and scale (e.g., 1-to-10) by users would be linked/stored in the relational database for creating reports;
(4) The ability to see/compare the opinions expressed by responding users with the actual votes cast by ERs;
(5) All user data (except user name and street address which are stored in a separate database) including: yes/no position, scale (e.g., 1-10), topic/subtopic/issue, and opinion text;
(6) Additional voluntary demographic information: multiple fields sufficient for the invention's purposes, including but not limited to age, gender, education, marital status, income range, etc., would be linked to the position/opinion (not user name or address) to add value to the opinion;
(7) User data and demographic information are searchable within the invention's website's relational database using one or any combination of fielded data, filters, or keywords/phrases;
(8) User identity information (name, street number, street name and email address) is kept separate from their positions and opinions and is never provided to third parties, with the exception of users' opinions which user designates for transmission to their ERs;
(9) The issues/opinion data and the demographic data are stored separately from user's name, street number, street name and email address within the invention database so as not to be accessible by those ERs or others requesting reports on users' positions/opinions on specific issues;

(10) The present invention provides media syndicators and/or host stations (televisions, radio, newspapers, magazines, etc.) with a link such that individual media host(s) can create, based on the content of their programs on any given day, their own yes/no issues/opinions linked to an ER matrix by zip code or on a per-issue basis. The present invention retains opinion data in its relational database for all such user involvement described above. The present invention provides issues lists to individual radio/television station host/programs to reflect issues unique to their program/shows/locality on a same-day-as-aired basis. The invention media opinion database is the basis for reports on user opinion/trend data to media companies/syndicators and other interested parties on a subscription basis;

(11) The present invention also provides a feature which permits under-18 site users to register their opinions on a Yes/No and scale (1-10) basis with or without a personal text opinion which will become part of the invention relational database for retrieval on a subscription report basis by corporate, educational, and governmental entities. These recipients include, but are not limited to, entities in education, media, fashion, and government, among many others. This feature provides real-time, pulse-polling, trend-tracking information on a paid-for/subscription report basis to corporate, educational and government entities.

Report features: The present invention also allows reports to be generated so that:

(1) A company, as a non-individual user, can obtain customized issue/opinion reports from invention users on an issue/opinion, keyword/phrase, etc., basis, for its decision-making purposes;

(2) A company, as a non-individual user, can obtain customized issue/opinion reports on an issue/opinion, keyword/phrase, etc., basis, on its competitors;

(3) A corporation, as a non-individual user, can access trend-tracking/opinion and demographic data (e.g., percentages voting YES/NO on specific issues of interest) on an issue/opinion, keyword/phrase, etc., basis;

(4) An ER, candidate, or campaign committee, etc., as a non-individual user, can acquire access to corporate-related and issue and demographic data on an issue/opinion, keyword/phrase, etc., basis;

(5) An individual user can obtain a customized report based on any criteria available (keyword/phrase, etc.) via the invention's retrieval capabilities;

(6) The present invention provides the public/media and users with a correlation between the pending legislation and invention trend-tracking opinion data and an ER's voting record on a particular issue.

Media use of invention:

(1) The present invention also provides benefits and features that allow media (radio, print, television) to publicize to their audiences the present invention as a touchstone for one-stop means to mobilize, channel, capture audience/readership personal opinions and to electronically transmit them to ERs/decision makers, etc. Whereas typical media audiences are thwarted in completing their intentions to voice their opinions on media-generated issues because they do not know where to go and have no easy way to accomplish such;

(2) Radio/TV/print media stations or their syndicators can link directly to the invention's website by subscription or otherwise. This makes available to radio/TV/print media listeners/viewers/readers issues presented each day by these entities thereby creating their own issues list based on the invention technology and structure. In other words, the invention database is linked individually to these entities to present to their markets issues unique to their program/shows/publications on a same-day-as-show or periodic basis; further, their opinion data can be identified to determine how their audiences are trending on given issues;

(3) The present invention also provides worldwide, web-based streaming interviews of ERs and others on social, political and cultural issues allowing users to address questions to the person being interviewed and allow the interviewee to respond;

(4) The present invention provides media syndicators and/or host stations (televisions, radio, print media, etc.) with a link to the invention such that individual media hosts can create, based on the content of their shows on any given day, their own yes/no issues/opinions linked to an ER matrix by zip code or on a per-issue basis. The present invention retains opinion data in its relational database for all such user involvement described above. The present invention provides issues lists to individual radio/television station host/programs to reflect issues unique to their program/shows/locality on a same-day-as-show basis. The invention opinion database is the basis for reports on user opinion/trend data to media companies and other interested parties on a subscription basis.

Home Page features include tabs which label the following features which include but are not limited to:

(1) Access to specific legislation by keyword/phrase searches to see the voting records of local, state or Federal ER(s);

(2) See how ERs voted on any given issue or legislation;

(3) Provides voting records that are currently available to the public electronically but that are presently difficult to accesses via legislative internet websites and thus do not provide ready accountability to the public by ERs;

(4) Allows users to access a bulletin board where users can submit date, place, time and issue/candidate information for posting on the website so that others in a district/town/city can be informed as to these events making them potentially more successful in influencing a decision-making body's decision in the direction the community is recommending. This feature is expandable so as to include critical (or even routine) meetings of County Boards of Supervisors, City Councils, and school boards. The invention may also locate and publish this information as well;

(5) Easy access to Federal ERs' voting records in real-time. This information has previously been essentially inaccessible to the public based upon the difficulties in doing so because using current Senate/House of Representatives' websites, for example, is a clumsy, tedious and complicated process. The present invention provides real-time accountability to constituents by connecting to the ERs' voting pages after the legislation is voted upon. This is equally applicable for state and local legislative accountability;

(6) Provides a user with a platform to launch a referendum/initiative or provide support thereof. The present invention provides easy, immediate, real-time web access to requirements and guidelines to start referenda movements and/or initiatives at the city, county, state or Federal levels. The present invention provides printable petition forms for the signatures of registered voters to launch the referenda/initiatives. The present invention also provides a webpage with a list and links to all current city, county, state and Federal referenda and initiatives so users in all pertinent jurisdictions/localities can respond;

(7) Local groups promoting a local issue can subscribe for a limited, renewable period of time to solicit local opinions on that issue. The subscriber would provide email addresses for the local officials having decision-making authority and local residents would convey their opinions to these officials via the invention site on the local issue and invention would provide opinion, trending, and demographic data pertaining to this local issue to local decision makers;

(8) Other informational pages based on non-invention websites and databases.

Additional embodiments. The present invention may be accessed by users at kiosks or ATM-type machines in various locations. Kiosks could be rented by or licensed to retailer or other entity from invention. Examples include but are not limited to:

(1) Airports so that airline customers could instantly provide information to and have access to the Federal Aviation Agency (FAA) as to airline practices (complaints and commendations). Airlines could request and receive instant customer feedback as to its customer service, policies and pricing. Coupons could be offered to customers who take the time to complete the real-time questionnaire. Information acquired by the airline would be proprietary. Information provided to the FAA would belong to the invention/owner;

(2) Major retail sites so that their customers could instantly provide information to and have access to the retailer, product manufacturers, etc. Coupons could be offered to customers who take the time to complete the invention website's real-time questionnaire. Site types include but are not limited to mass retailers, banks, department stores, grocery stores, car dealerships, restaurants, car rental offices, etc.;

(3) Street corners and strip-malls, in-store machines that provide internet access that allow the public access this invention website for the various purposes described above.

Alternative Income Model: Based upon its pulse-polling, trend-tracking, real-time, user-driven, raw-opinion-data database, which is generated by its users, the present invention also offers candidates for public office (and their organizations), Federal ERs, media (radio/television/print/internet), government entities, corporations, and academic/research institutions vote data reports based upon combinations of numerous data criteria in its relational database for differing fees depending upon the number of fields, the periods of time required, level of analysis and substantive/issue coding of opinion data, level(s) of institutional access to the data, and other variables. For example:

Candidates Vote Data Report Function:

(1) Candidates tab appears on Home Page;

(2) User clicks on Candidates tab (no user registration or login is necessary to use this function);

(3) User is taken to the Candidates Welcome page. Before casting a vote for the data report, the users must indicate their party affiliation, and their city, county and state. For each candidate, the user is presented with radio buttons reflecting a scale of level of support ranging from support, leaning toward, undecided, leaning away, or against, as well as a text box for the user to express the basis for his/her level of support;

(4) A given user can support only one candidate per day which limitation is programmed into the site. Otherwise, users can comment or opine upon, in a non-support basis, any or all candidates without limitation;

(5) User then clicks "Submit" and the vote data is submitted to the database. The user may then return to the Candidates Welcome Page where the user has the option of viewing the Candidates Daily Standings for all candidates to see the real-time support votes for the Democratic, Republican, and other candidates for a particular office;

(6) When the user clicks on a daily standings link, he/she is presented with a graph reflecting the relative positions of each candidate with the total number of votes cast on a pulse-polling, real-time basis. User can also go directly to the daily standings link to see the current candidate standings without submitting a vote;

(7) All of the data collected in this inventive process is stored in the relational database and is available for reports to the candidates, their campaign staff, the media, educational/research institutions, government agencies, corporations, and other interested parties on a for-fee/subscription basis.

In a particularly preferred embodiment, a website for the present invention functions as follows. A user begins at an initial Home Page or Log-in Screen. At this point a user may register as a free user or a subscribed user or a registered user may log-in, using a user name and password. In order to register, a user must provide certain data, including but not limited to, city, county, state, zip code, e-mail address, user name, and password. A confirmation/activation email is sent to the new user's email address.

As mentioned above, a new user is given the option to become a free user or a subscriber. Subscription is not mandatory and the free-user status need never be changed but can be changed at any time upon subscription. A free user's opinions are stored in the pulse-polling, trend-tracking database only and are combined with all subscriber and other free user opinions for trend-tacking, pulse-polling and reporting purposes. However, a free-user's opinions are not delivered to elected officials as are subscriber opinions.

After logging-in, a user may navigate to a Candidate tab to submit an electronic vote or to view current electronic voting standings. The Candidate tab lists current candidates for elected office in upcoming elections in which the user has a vote. The list of candidates includes level of support scale/radio buttons, i.e., against, leaning away, undecided, leaning toward, support, and an opinion text box for a personalized opinion of up to 500 words. A user is limited to one electronic support vote per day. After the electronic vote is submitted, the data is delivered and stored in a relational database for the system. A graph for each election displays real-time tracking of the number of support votes for each candidate, including percentages.

A user may also access a My Profile tab that contains all registration and voluntary demographic data for each user. Demographic data consists of gender, age, education level, religion, income range, preferred news sources, nationality, political party, number of children, marital status, associations, and voting history with others to be added as needed. All fields contain dropdown lists or text boxes. This data remains anonymous and is separated from personal identity information connected with free and subscription features per a privacy policy. A user can update/change his/her profile data at any time by clicking on this tab and entering new data or revising existing data.

All profile data is entered into the relational database. Personal identity information entered upon subscription is kept separate per a published privacy policy. A user's name, residence address and email address are only included in a daily email auto-send reports to elected officials containing constituent opinions so the elected official can verify constituency if necessary.

A Subscribe navigation tab is also available. This tab appears only when a user chooses to register as a free user. The tab gives the free-user the on-going option to obtain the advantages of subscription. Once a free user becomes a subscription user, this Subscribe tab will no longer be displayed.

A user may then go to the Topics List screen, which lists topics in alphabetical order. If a user is unable to find a topic of interest, a key-word search option is available. If a topic of interest is not included in the search results, the user can suggest an issue and submit an opinion on the issue. Each topic may lead to a list of subtopics which operates as the topics list. The list of topics may continue through as many levels as necessary to state all topics of interest to users.

Once a user selects a topic, subtopic, and issue, the user is taken to an opinion submission screen. The opinion submission screen contains: (1) a statement of the issue that can be answered "yes" or "no"; (2) a scale (i.e., 1 to 10) for the strength of the user's opinion; and (3) a text box for a personal opinion of up to 500 words. All three fields are required to be filled in prior to submission. The user is given the option of including demographic data with his/her opinion submission. Upon submission, the demographic data and user opinion data are entered into a relational database. All users are taken to a "Yes/No percentage" graphic relating data on the issue submitted at the conclusion of each opinion submission to see real-time, trend-tracking by percentage on the issue. A subscription user, having paid the money for a subscription, can elect to obtain a personalized list of ERs and to have their opinion sent to selected ERs.

The inventive system sends an ER match query to an elected representative database to obtain a user's personalized list of ERs based on the user's residence address. Typical ERs include President, Vice President, two US senators, a US House representative, Governor, state senator, state assembly person, and candidates for such positions. This list is automatically updated whenever there are changes based upon regular or special elections, retirements, deaths, recalls or impeachments. Mayors, county supervisors and other ERs may be added to this list in the future.

A first ER list presents a listing all of a user's constituent-validated ERs including radio buttons. The user selects the ERs from the list to receive the submitted opinion and clicks "Send Opinion." Because such opinions are from validated constituents and personally composed, ERs must by law read and tally the opinions to the end that they influence legislative outcomes. All opinion data, including the ERs to whom opinions are sent, is stored in a relational database. Relational database can refer to any of the available databases in the system, including the relationship between data in two separate databases. Storage in the relational database permits the inventive system to document what opinions are sent to which ERs on which issues so as to accumulate ER accountability data.

A user also has the option of designating an opinion for polling only, by using a radio button. Such would be the case when the user does not want to submit his opinion (and identity to an ER) or when the issue is not actionable by the ERs but would be of interest to other groups or institutions and/or the media. This opinion data is also stored in the system's relational database.

After a subscription user designates ER(s) to receive a specific opinion, the designated ERs are sorted and matched against ERs in the elected representative database. The ERs are separated into three groups: ERs with email addresses, ERs with web forms, ERs with neither email addresses nor web forms, and new ERs whose email or web forms have not been provided by their legislative bodies. All opinions for designated ERs with email addresses are compiled into a daily, auto-send report which is emailed to all ERs having constituent opinions on a given day. Designated ERs with web form links are sorted and matched. Designated ERs with neither email addresses nor web form links are sorted and matched.

A second ER list displays designated ERs with web forms including their links, and designated ERs with neither email addresses nor web forms. User's issue and opinion from the opinion submission screen are repeated here. The user has the option to copy both the issue and opinion information and then separately link to each designated ER with a web form and electronically paste the issue/opinion information into the web form for submission. This process can be repeated for as many ERs has present web form links on this screen. When a user clicks on a web form link, only the fact of the click-through to the ER's web form is stored in the relational database. The issue and opinion data entered into the ER's web form is not stored. Such data was previously stored in the relational database.

The system may also create "Yes/No percentage" and issue opinions reports for ERs, users, and the media. An introductory screen explains the purpose, benefits, and scope of the report. The reports address constituent-validated Yes/No percentages and opinions generated by the invention site on all political, social, cultural, and economic issues presented via the site. ERs and the public will now be able to know their user/constituents' opinions on all issues they have electronically submitted to their ERs via invention site on any given day. This data will be current as of midnight the previous full day.

Also included in this report is the same data regarding how all of ER constituents in the same legislative body (i.e., US House, Senate, etc.) have voted and opinion content on all issues constituents have submitted to their ERs. The report also includes yes/no percentages regarding how all site users have voted on those issues so that all ERs can see how his/her district compares with the total, national site community, or other state(s) voted on given issues.

This daily public opinion data can create the transparency and accountability missing in today's legislative system by showing how the public is trending on given issues when compared to or contrasted with how ERs respond to the trending within their districts and their actual votes on these issues.

The data contained in these reports will enable ERs to: 1) vote and make other decisions based upon validated constituent input; 2) build support with other ERs whose constituencies are like minded on legislation or committee decisions to assist in coalition building for pending legislation votes; 3) determine whether other ERs are voting and making other decisions consistent with their constituencies' majority positions; 4) persuade their colleagues in other districts to vote with the majority in situations where constituent data is split evenly, showing clear directions/positions on particular issues.

US citizens will benefit from these reports because they will know that their collective positions on important political, social, cultural, and economic issues are known to their ERs and can form the basis for their votes and decisions. Further, ERs will know that their constituents know that they have this important data and will be expected to act in accordance with that data. Lastly, the invention site has all of this ER data and other data to publicize pulse-polling issue trends and ER responsiveness to those trends. Citizens will also know that this data availability to their ERs via the invention, as an unbiased, non-partisan third party, will constitute a return to representative accountability, transparency, peer oversight, and coalition building based upon constituent positions. An ER may also elect to view the same constituent reports from other ERs.

Political action committees, blogs, search engines, media groups, etc., jointly referred to herein as political action groups (PAGs) have the option to monetize their web sites by linking to the inventive web site. After a subscription and approval process, the PAG may put a link to the inventive website on its own website. A user of the PAG website may then click on the link to the inventive website. The user of the PAG website may explore and use the inventive website as any user described above. If such a visitor becomes a subscription user of the inventive website, then the PAG would receive a payment, i.e., a referral fee, per each subscription directed through the PAG website. Issue and opinion data generated by users from a particular PAG is flagged as coming from the PAG so as to provide PAG with its users' opinion trend-tracking data. Each PAG may have its own a data subset.

The inventive website may also be embedded in another Host Site. The Host Site contains a navigation tab to the inventive website. Users from the Host Site click through to the inventive website. Such click-through takes the user to a clone or duplicate inventive website having all of the features, functions, and services resident on the Host Site. The Host Site is compensated per click-through based upon a negotiated agreement. Users of the Host Site, i.e., blog members or member organizations, also have the option to monetize their sites based upon subscriptions to the inventive site generated from their own sites. Such would operate as the PAG monetization as described above. Issue and opinion data generated by Host users is flagged in a host-generated data subset in the relational database. The inventive website would make the Host's subset issue and demographic data available to the Host organization based upon written agreement.

Although several embodiments have been described in detail for purposes of illustration, various modifications may be made without departing from the scope and spirit of the invention. Accordingly, the invention is not to be limited, except as by the appended claims.

What is claimed is:

1. A method for compiling, trend-tracking, and reporting opinion data, comprising the steps of:
   providing a system for users to submit opinion data, wherein the system comprises distinct but interactive computer databases including an issues database, a user identity database, and a user opinion database;
   compiling a list of issues for storage in the issues database;
   collecting user identity information for storage in the user identity database;
   presenting the list of issues to a user;
   gathering opinion data relating to at least one of the issues on the list of issues;
   maintaining the user identity database separate from the user opinion database such that the opinion data does not reveal the user identity information of the users providing the opinion data;
   storing the opinion data in the user opinion database for real-time, trend-tracking of public opinion on the list of issues stored in the issues database; and
   generating reports containing the opinion data, and making available the reports to decision makers interested in the list of issues addressed by the reports;
   wherein the computer databases further comprise a demographic database, the system collects demographic information from the users for storage in the demographic database, and the real-time, trend-tracking of public opinion includes relating the public opinion to the demographic information stored in the demographic database.

2. The method of claim 1, wherein the computer databases further comprise a decision makers database and a user communication database.

3. The method of claim 2, further comprising the steps of generating a communication from a user containing said user's opinion data on an issue, storing said generated communication in the user communication database, identifying decision makers from the decision makers database interested in the issue from the list of issues and/or related to said user, and transmitting said generated communication to said identified decision makers.

4. The method of claim 3, wherein the decision makers related to said user are identified based upon residence information of said user compiled in the user identity database.

5. The method of claim 3, wherein the transmitting step further comprises the step of allowing the user to select to which decision makers from the decision makers database the communication is to be transmitted.

6. The method of claim 2, further comprising the step of connecting the user to a web form or email address of a decision maker from the decision makers database.

7. The method of claim 2, wherein the decision makers database maintains voting records, attendance records, and voting records versus public opinion information of decision makers who are elected representatives.

8. The method of claim 1, further comprising the step of updating the list of issues with current political, business, news and public interest issues.

9. A method for compiling, trend-tracking, and reporting opinion data, comprising the steps of:
   providing a system for users to submit opinion data, wherein the system comprises distinct but interactive computer databases including an issues database, a user identity database, a user opinion database, a decision makers database, a demographic database, and a user communication database;
   compiling a list of issues for storage in the issues database;
   collecting user identity and demographic information from the users for storage in the user identity and demographic databases;
   presenting the list of issues to a user;
   gathering opinion data relating to a least one of the issues on the list of issues;
   maintaining the user identity database separate from the user opinion and demographic databases such that the opinion and demographic data does not reveal the user identity information of the users providing the opinion data;
   storing the opinion data in the user opinion database for real-time trend-tracking of public opinion on the list of issues stored in the issues database and relating the public opinion to the demographic information;
generating reports containing the opinion data; and
making available the reports to decision makers interested in the list of issues addressed by the reports.

10. The method of claim 9, further comprising the steps of generating a communication from a user containing said user's opinion data on an issue, storing said generated communication in the user communication database, identifying decision makers from the decision makers database interested in the issue from the list of issues and/or related to said user, and electronically transmitting said generated communication to said identified decision makers.

11. The method of claim 10, wherein the decision makers related to said user are identified based upon residence information of said user compiled in the user identity database.

12. The method of claim 10, wherein the transmitting step further comprises the step of allowing the user to select to which decision makers from the decision makers database the communication is to be transmitted.

13. The method of claim 9, further comprising the step of connecting the user to a web form or email address of a decision maker from the decision makers database.

14. The method of claim 9, wherein the decision makers database maintains voting records, attendance records, and voting records versus public opinion information of decision makers who are elected representatives.

15. The method of claim 9, further comprising the step of updating the list of issues with current political, business, news and public interest issues.

16. The method for compiling, trend-tracking, and reporting opinion data, comprising the steps of:
  providing a system for users to submit opinion data, wherein the system comprises distinct but interactive computer databases including an issues database, a user identity database, a user opinion database, a decision makers database and a user communication database;
  compiling a list of issues for storage in the issues database;
  collecting user identity information for storage in the user identity database;
  presenting the list of issues to a user;
  gathering opinion data relating to at least one of the issues on the list of issues;
  maintaining the user identity database separate from the user opinion database such that the opinion data does not reveal the user identity information of the users providing the opinion data;
  storing the opinion data in the user opinion database for real-time trend-tracking of public opinion on the list of issues stored in the issues database;
  generating a communication from a user containing said user's opinion data on an issue and storing said generated communication in the user communication database;
  identifying decision makers from the decision makers database interested in the issue from the list of issues and/or related to said user; and
  transmitting said generated communication to said identified decision makers.

17. The method of claim 16, wherein the computer databases further comprise a demographic database, the system collects demographic information from the users for storage in the demographic database, and the real-time, trend-tracking of public opinion includes relating the public opinion to the demographic information stored in the demographic database.

18. The method of claim 16, further comprising the steps of generating reports containing the opinion data, and making available the reports to decision makers interested in the list of issues addressed by the reports.

19. The method of claim 16, further comprising the steps of generating reports containing the opinion data, and making available the reports to decision makers interested in the list of issues addressed by the reports.

20. The method of claim 16, further comprising the step of connecting the user to a web form or email address of a decision maker from the decision makers database.

21. The method of claim 16, wherein the decision makers database maintains voting records, attendance records, and voting records versus public opinion information of decision makers who are elected representatives.

22. The method of claim 16, further comprising the step of updating the list of issues with current political, business, news and public interest issues.

* * * * *